UNITED STATES PATENT OFFICE 2,311,093

REARRANGEMENT OF ISO-DIALKYLSTIL-BESTROLS TO DIALKYLSTILBESTROLS

Arthur Serini, Berlin, and Konrad Steinruck, Berlin-Tegel, Germany, assignors to Schering Corporation, Bloomfield, N. J., a corporation of New Jersey No Drawing. Application December 16, 1939, Serial No. 309,610. In Germany January 13, 1939

3 Claims. (Cl. 260—619)

This invention relates to a process for the manufacture of dialkyl stilbestrols and more particularly to the rearrangement of iso-dialkyl stilbestrols to said dialkylstilbestrols by treating the former in a manner known for the transformation of cis-trans isomers.

Dialkylstilbestrols, such as the diethyl stilbestrol, may be prepared according to the method of Dodds et al. (see Nature, London 1938, vol. 141, page 247) in the following manner:

Desoxyanisoin is reacted with ethyl iodide and sodium ethylate. The ethyldesoxyanisoin obtained is then converted by means of ethyl magnesium bromide into 3,4-dianisyl-hexanol-3. By splitting off water from this tertiary carbinol, e. g. by treatment with phosphorus tribromide, and subsequent heating with dimethyl aniline to split off any halogen that has replaced hydroxyl, the dimethylether of the diethyl stilbestrol is obtained. This ether is saponified by treating with an alcoholic solution of potassium hydroxide in an autoclave to about 200° C., yielding the free diethyl-stilbestrol of the melting point 168° C.

On splitting off water from the tertiary alcohol as mentioned above the desired dimethylether of diethylstilbestrol is obtained only in a poor yield, the main portion of the reaction product being a noncrystallizing oil. We have found that if this oil is heated in an autoclave with an alcoholic solution of potassium hydroxide to a temperature below 200° C. for the purpose of saponifying the ether, the main portion of the reaction product is a substance isomeric with diethyl stilbestrol, an iso-diethyl stilbestrol, having a melting point of about 144–145° C. The estrogenic activity of this substance amounts only to about 1/25 of that of diethyl stilbestrol.

We have found further that it is possible to readily transform such cis—i. e. iso-dialkyl stilbestrols into trans-dialkylstilbestrols, their physiologically more active isomers. This rearrangement may be illustrated, for instance, by the following formulas:

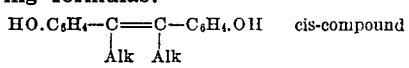
cis-compound

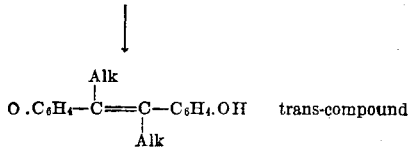
trans-compound wherein Alk means an alkyl radical such as methyl, ethyl, propyl and the like.

This rearrangement may be carried out in different ways as they are known for the rearrangement of cis into trans isomers, e. g. of maleic acid to fumaric acid and the like as they are described, for example, in Houben-Weyl, "Methoden der organischen Chemie" 3rd edition, 1925, vol. 2, page 1288 or in Bernthsen, "Kurzes Lehrbuch der organischen Chemie" 13th edition, 1918, page 285. Thus, the rearrangement may be performed by heating the cis-compound in an autoclave with an alcoholic solution of potassium hydroxide to temperatures of above 200° C., by treating a solution of the starting material with metal catalysts, such as noble metal catalysts and the like, preferably at ordinary temperature, or by heating with traces of iodine to rather high temperatures, advantageously to about 180° C., and by other methods.

The following examples illustrate the invention without, however, limiting the same to them.

Example 1

10 gs. of iso-diethyl stilbestrol are heated in an autoclave with a solution of 20 gs. of potassium hydroxide in 40 gs. of alcohol to 225° C. for 16 hours. After cooling, the mixture is diluted with water and acidified with hydrochloric acid while cooling with ice. Most of the diethyl stilbestrol formed precipitates in crystalline form and is separated by filtration with suction. The remainder is obtained by extracting the mother liquor with ether. All together 8 gs. of diethyl stilbestrol are obtained having a melting point of 168° C.

Example 2

10 gs. of iso-diethyl stilbestrol are dissolved in 500 ccs. of ether and shaken with a palladium catalyst at room temperature for 24 hours. Then the catalyst is removed and the ethereal solution evaporated to dryness. The residue is recrystallized from dilute methanol and yields 8 gs. of diethyl stilbestrol of the melting point 168° C.

Example 3

10 gs. of iso-diethyl stilbestrol are heated after addition of a small crystal of iodine to 180° C. for 2 hours. After cooling the product is recrystallized from dilute methanol. Thus, 5 gs. of diethyl stilbestrol of a melting point of 168° C. are obtained. From the mother liquor oily fractions are obtainable. From these by repeated treating with iodine to 180° C. further amounts of diethyl stilbestrol may be obtained.

Of course, many other changes and variations in the reaction conditions, the solvents used, temperature and duration of reaction, working up and purification of the reaction products, and the like may be made by those skilled in the art in accordance with the principles set forth herein and in the claims annexed hereto.

What we claim is:

1. A process for the manufacture of dialkyl stilbestrols comprising treating an iso-dialkyl stilbestrol in an autoclave with an alcoholic solution of an alkali metal hydroxide to temperatures of above 200° C.

2. A process for the manufacture of dialkyl stilbestrols comprising treating an iso-dialkyl stilbestrol in an autoclave with an alcoholic solution of potassium hydroxide to temperatures of above 200° C.

3. A process for the manufacture of diethyl stilbestrols comprising treating iso-diethyl stilbestrols in an autoclave with an alcoholic solution of potassium hydroxide to temperatures of above 200° C.

ARTHUR SERINI.
KONRAD STEINRUCK.